US00RE51090E

(19) United States
(12) Reissued Patent
Kaltenbach et al.

(10) Patent Number: US RE51,090 E
(45) Date of Reissued Patent: Oct. 27, 2026

(54) METHOD FOR OPERATING A DRIVE SYSTEM OF A MOTOR VEHICLE AND DRIVE SYSTEM

(71) Applicant: ZF Friedrichshafen AG, Friedrichshafen (DE)

(72) Inventors: Johannes Kaltenbach, Friedrichshafen (DE); Fabian Kutter, Kressbronn (DE); Stefan Beck, Eriskirch (DE); Matthias Horn, Tettnang (DE); Uwe Griesmeier, Markdorf (DE); Michael Roske, Friedrichshafen (DE)

(73) Assignee: ZF Friedrichshafen AG, Friedrichshafen (DE)

(21) Appl. No.: 18/100,594

(22) Filed: Jan. 24, 2023

Related U.S. Patent Documents

Reissue of:
(64) Patent No.: 11,186,160
Issued: Nov. 30, 2021
Appl. No.: 16/352,053
Filed: Mar. 13, 2019

(30) Foreign Application Priority Data

Mar. 14, 2018 (DE) ..... 10 2018 203 854.6

(51) Int. Cl.
*B60K 6/365* (2007.10)
*B60K 6/40* (2007.10)
(Continued)

(52) U.S. Cl.
CPC ..... *B60K 6/365* (2013.01); *B60K 6/40* (2013.01); *B60K 6/44* (2013.01); *F16H 3/66* (2013.01);
(Continued)

(58) Field of Classification Search
CPC .. B60K 6/365; B60K 6/387; B60K 2006/381; B60K 6/40; B60K 6/44; B60K 6/445;
(Continued)

(56) References Cited

U.S. PATENT DOCUMENTS 7,300,374 B2 * 11/2007 Bucknor ..... B60L 15/2054 475/5
9,193,253 B2 * 11/2015 Lee ..... B60K 6/445
(Continued)

FOREIGN PATENT DOCUMENTS

CN 102596612 A 7/2012
CN 105473366 A 4/2016
(Continued)

OTHER PUBLICATIONS

Chinese Office Action in Reference to Application No. 201910046587.2 dated Feb. 2, 2024.
(Continued)

*Primary Examiner* — William V Gilbert
(74) *Attorney, Agent, or Firm* — Dority & Manning, P.A.

(57) ABSTRACT

A drive system (1) of a motor vehicle includes a first planetary gear set (2), a first electric machine (13) coupled to a ring gear (5) of the first planetary gear set (2) directly or indirectly via a second planetary gear set (3), and a second electric machine (14) coupled to a sun gear (4) of the first planetary gear set (2) directly via a third form-fit shift element (C) or indirectly via the second planetary gear set (3). The sun gear (4) of the first planetary gear set (2) is braked against the housing by engaging a first form-fit shift element (A). The sun gear (4) of the first planetary gear set (2) is coupleable to a carrier (6) of the first planetary gear set (2) via a second form-fit shift element (B) while providing a direct drive at the first planetary gear set (2).

20 Claims, 9 Drawing Sheets

(51) Int. Cl.
*B60K 6/44* (2007.10)
*F16H 3/66* (2006.01)
*F16H 3/72* (2006.01)

(52) U.S. Cl.
CPC ..... *F16H 3/727* (2013.01); *B60Y 2200/92* (2013.01); *F16H 2200/2007* (2013.01); *F16H 2200/2064* (2013.01); *F16H 2200/2094* (2013.01)

(58) Field of Classification Search
CPC ..... B60K 6/547; B60K 6/36; B60K 17/046; B60Y 2200/92; F16H 3/66; F16H 3/727; F16H 2200/20; F16H 2200/2007; F16H 2200/2064; F16H 2200/2094
See application file for complete search history.

(56) References Cited

U.S. PATENT DOCUMENTS

| | | | | |
|---|---|---|---|---|
| 9,221,327 | B2 * | 12/2015 | Ono | B60W 20/00 |
| 9,399,394 | B2 | 7/2016 | Kaltenbach et al. | |
| 9,637,022 | B2 * | 5/2017 | Gavling | B60L 50/16 |
| 9,694,663 | B2 * | 7/2017 | Janson | F16H 3/48 |
| 10,195,932 | B2 * | 2/2019 | Brehmer | B60K 6/44 |
| 2007/0232438 | A1 * | 10/2007 | Kamm | F16H 3/666 475/275 |
| 2008/0167782 | A1 * | 7/2008 | Belmont | B60K 6/445 475/5 |
| 2008/0194369 | A1 * | 8/2008 | Boutou | B60L 50/61 475/5 |
| 2008/0312021 | A1 * | 12/2008 | Oba | B60K 6/365 475/5 |
| 2011/0086737 | A1 * | 4/2011 | Phillips | B60K 6/445 475/5 |
| 2017/0349041 | A1 | 12/2017 | Brehmer et al. | |
| 2019/0078664 | A1 * | 3/2019 | Beck | F16H 3/725 |
| 2019/0078665 | A1 * | 3/2019 | Beck | F16H 3/66 |
| 2019/0283564 | A1 * | 9/2019 | Kaltenbach | F16H 3/66 |

FOREIGN PATENT DOCUMENTS

| | | | | |
|---|---|---|---|---|
| DE | 102011087995 | A1 | 6/2013 | |
| DE | 102011089708 | A1 | 6/2013 | |
| DE | 102013214317 | A1 | 1/2015 | |
| DE | 102015214040 | B4 * | 8/2018 | B60K 6/365 |
| WO | WO-2010144753 | A1 * | 12/2010 | B60K 6/12 |

OTHER PUBLICATIONS

German Office Action DE 10 2018 203 854.6, dated Oct. 4, 2022. (8 pages).

* cited by examiner

| Gear | Engaged Shift Elements | | | | | | |
|---|---|---|---|---|---|---|---|
| | D | A | E | F | G | B | C |
| 1 | X | X | | | | | |
| 2 | | X | | | X | | |
| 3 | | X | | X | | | |
| 4.1 | | X | X | | | | |
| 4.2 | | | X | | X | | |
| 4.3 | X | | X | | | | |
| 4.4 | | | X | X | | | |
| 4.5 | | | | X | X | | |
| 4.6 | | | X | | | X | |
| 4.7 | | | | X | | X | |
| 4.8 | | | | | X | X | |
| 4.9 | | | X | | | | X |
| 4.10 | | | | X | | | X |
| 4.11 | | | | | X | | X |
| ZG1 | X | | | | | X | |
| ZG2 | X | | | | | | X |
| E1 | | X | | | | | |
| E2 | | | | | | X | |
| EDA-V | | | | | | | X |
| EDA-R | | | | | X | | |

Fig. 3

| Gear | Engaged Shift Elements | | | | | |
|---|---|---|---|---|---|---|
| | A | D | C | E | F | B |
| 1 | X | | | X | | |
| 2.1 | X | X | | | | |
| 2.2 | | X | X | | | |
| 2.3 | | X | | X | | |
| 2.4 | | | X | X | | |
| 2.5 | | X | | | | X |
| 2.6 | | | X | | | X |
| 2.7 | | | | X | | X |
| 3.1 | X | | | | X | |
| 3.2 | | | X | | X | |
| 3.3 | | | | X | X | |
| 3.4 | | | | | X | X |
| E1 | X | | | | | |
| E2 | | | | | | X |
| EDA-V | | | X | | | |

Fig. 6

| Gear | Engaged Shift Elements | | | | | |
|---|---|---|---|---|---|---|
| | A | D | E | F | C | B |
| 1 | X | | X | | | |
| 2.1 | X | X | | | | |
| 2.2 | | X | X | | | |
| 2.3 | | X | | | X | |
| 2.4 | | X | | | | X |
| 2.5 | | | X | | | X |
| 3.1 | X | | | X | | |
| 3.2 | | | X | X | | |
| 3.3 | | | | X | X | |
| 3.4 | | | | X | | X |
| 3.5 | | | | | X | X |
| ZG | | | X | | X | |
| E1 | X | | | | | |
| E2 | | | | | | X |
| EDA-V | | | | | X | |

Fig. 11

| Gear | Engaged Shift Elements | | | | | |
|---|---|---|---|---|---|---|
| | A | B | C | D | E | F |
| 1 | X | | | | X | |
| 2.1 | X | | | | | X |
| 3.1 | X | | | X | | |
| 3.2 | | X | | X | | |
| E1 | X | | | | | |
| E2 | | X | | | | |
| EDA-V | | | X | | | |

Fig. 14

METHOD FOR OPERATING A DRIVE SYSTEM OF A MOTOR VEHICLE AND DRIVE SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The invention relates generally to a method for operating a drive system of a motor vehicle. Moreover, the invention relates to a drive system.

BACKGROUND

DE 10 2013 214 317 A1 discloses a drive system of a motor vehicle, having at least one planetary gear set and two electric machines. A first electric machine of the two electric machines is permanently coupled to a sun gear of the planetary gear set. A further electric machine of the two electric machines is coupled either together with the first electric machine to the sun gear of the planetary gear set or to the ring gear of the planetary gear set, depending on the shift position of two form-fit, or positively locking, shift elements. The ring gear of the planetary gear set is either braked against the housing or coupled to the carrier of the planetary gear set, depending on the shift position of two further form-fit shift elements. The two further form-fit shift elements can also both be disengaged, similar to the two form-fit shift elements which cooperate with the further electric machine. In addition to this first planetary gear set, the drive system from DE 10 2013 214 317 A1 can also include at least one further planetary gear set. Moreover, DE 10 2013 214 317 A1 discloses a method for operating such a drive system. In particular, a method is known, which is utilized for carrying out an electrically actively synchronized powershift.

There is a demand for a new type of drive system and a method for operating such a drive system, which allow for a powershift between the electric gear ratios for a first electric machine as well as a purely electric starting operation with a high level of comfort and high efficiency without friction-locking powershift elements.

On the basis thereof, the problem addressed by the invention is that of creating a new type of method for operating a drive system of a motor vehicle and that of creating a corresponding drive system.

SUMMARY OF THE INVENTION

This problem is solved, according to a first embodiment, by a method for implementing a powershift, during a purely electric driving operation, from a first gear ratio for the first electric machine into a second gear ratio for a first electric machine, in which at least the following steps are carried out. Initially, the second electric machine is coupled via a third form-fit shift element to a sun gear of a first planetary gear set, for which the third form-fit shift element is engaged. Thereafter, a form-fit shift element to be disengaged for the powershift is unloaded via a second electric machine. Subsequent thereto, the form-fit shift element to be disengaged for the powershift is disengaged. Thereafter, a form-fit shift element to be engaged for the powershift is synchronized. Subsequent thereto, the form-fit shift element to be engaged for the powershift is engaged.

By these method steps, in the case of the drive system defined herein, a powershift is implementable, during a purely electric driving operation, for the gear ratios of the first electric machine without the need for friction-locking shift elements, solely by utilizing form-fit shift elements.

This problem is solved, according to a second embodiment, by a method for a purely electric starting operation, in which at least the following steps are carried out. Initially, the second electric machine is coupled via the third form-fit shift element to the sun gear of the first planetary gear set, for which the third form-fit shift element is engaged. Thereafter, during or after the presence of a demand for a starting torque, a torque is applied at a ring gear of the first planetary gear set via the first electric machine, and the second electric machine is operated in by closed-loop rotational speed control in such a way that the second electric machine supports the torque at the sun gear of the first planetary gear set.

By these method steps, in the case of the drive system defined herein, a purely electric starting operation is implementable without the need for friction-locking shift elements.

For the case in which the drive system includes an internal combustion engine in addition to the first and second electric machines, the internal combustion engine is decoupled or remains decoupled in order to carry out the method according to the first or second embodiment.

For the case in which the drive system includes a second planetary gear set in addition to the first planetary gear set, the second electric machine is either fixedly connected to a rotary element of the second planetary gear set or is coupleable to a rotary element of the second planetary gear set via at least one further form-fit shift element.

The drive system described herein is compact, makes a multitude of gear ratios available, and allows for the operation of the drive system in a multitude of operating modes.

BRIEF DESCRIPTION OF THE DRAWINGS

Preferred refinements result from the dependent claims and the description which follows. Exemplary embodiments of the invention are explained in greater detail with reference to the drawing, without being limited thereto. In the drawings, the following is shown:

FIG. 3 shows a shift pattern of the drive systems from FIGS. 1 and 2;

FIG. 6 shows a shift pattern of the drive systems from FIGS. 4, 5, 7, and 8;

FIG. 11 shows a shift pattern of the drive systems from FIGS. 9 and 10;

FIG. 14 shows a shift pattern of the drive systems from FIGS. 12 and 13.

DETAILED DESCRIPTION

Figure 1:
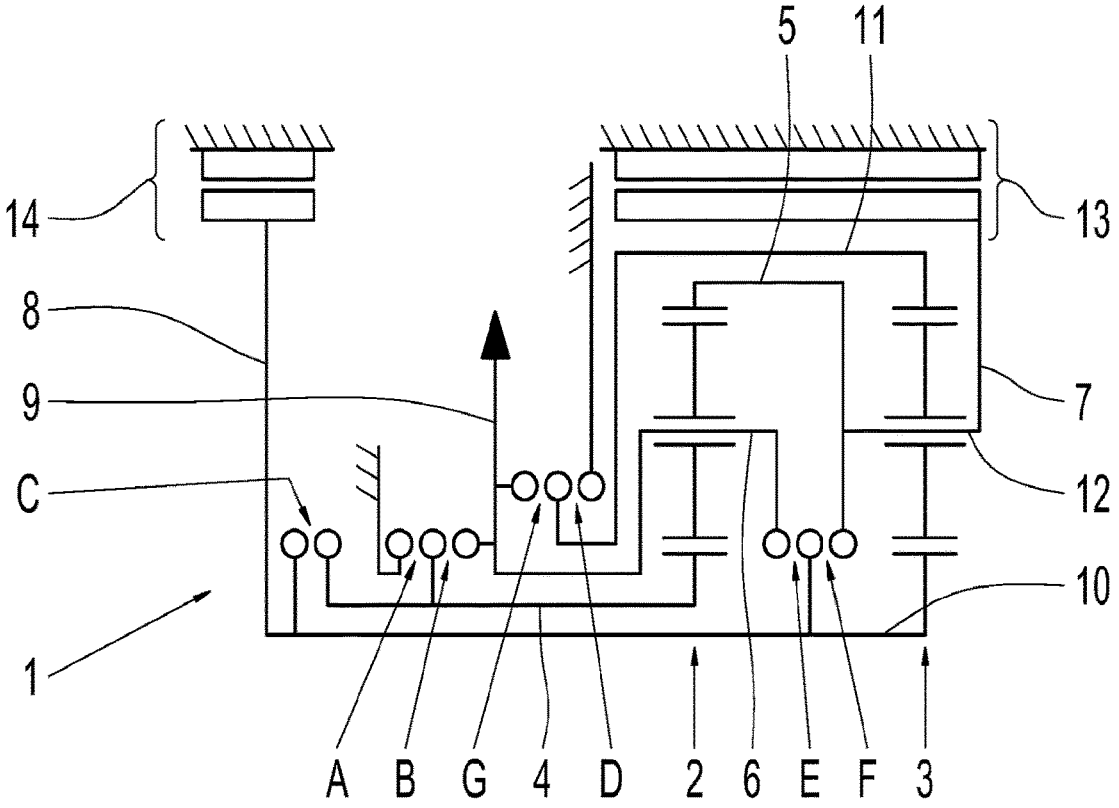
FIG. 1 shows a schematic diagram of a first embodiment of a drive system of a motor vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows one embodiment of a drive system 1 which includes two planetary gear sets 2 and 3 as well as two electric machines 13 and 14. FIGS. 2, 4, 5, 7, 8, 9, 10, 12 and 13 each show alternate embodiments of the drive system 1 having the two planetary gear sets 2 and 3 and the two electric machines 13 and 14.

Although the drive system 1 including the two planetary gear sets 2 and 3 is particularly preferred, it is pointed out that only the planetary gear set 2, which is referred to in the following as the first planetary gear set 2, is mandatory in the assembly of the drive system, while the planetary gear set 3, which is referred to in the following as the second planetary gear set 3, is an optional assembly of the drive system but is preferably present.

The first planetary gear set 2 includes a sun gear 4, a ring gear 5, and a carrier 6.

The sun gear 4 of the first planetary gear set 2 is able to be braked, or is "brakeable," against the housing via a first form-fit or positively locking shift element A. This is the case with all embodiments of the drive system 1 shown in FIGS. 1, 2, 4, 5, 7, 8, 9, 10, 12, and 13. As is known in the art, a form-fit or positively locking shift element may be, for example, a dog clutch.

Moreover, the sun gear 4 of the first planetary gear set 2 is coupleable to the carrier 6 of the first planetary gear set 2 via a second form-fit or positively locking shift element B while providing direct drive at the first planetary gear set 2, wherein the carrier 6 of the first planetary gear set 2 is fixedly connected to an output shaft 9. This is also the case with all embodiments of the drive system 1 of FIGS. 1, 2, 4, 5, 7, 8, 9, 10, 12, and 13.

As mentioned above, the drive system 1 includes the two electric machines 13 and 14, wherein the electric machine 13 is referred to in the following as the first electric machine 13 and the electric machine 14 is referred to in the following as the second electric machine 14. This is also the case with all embodiments of the drive system 1 of FIGS. 1, 2, 4, 5, 7, 8, 9, 10, 12, and 13.

The first electric machine 13 is coupled to the ring gear 5 of the first planetary gear set 2 either directly or indirectly via the optional second planetary gear set 3.

Figure 2:
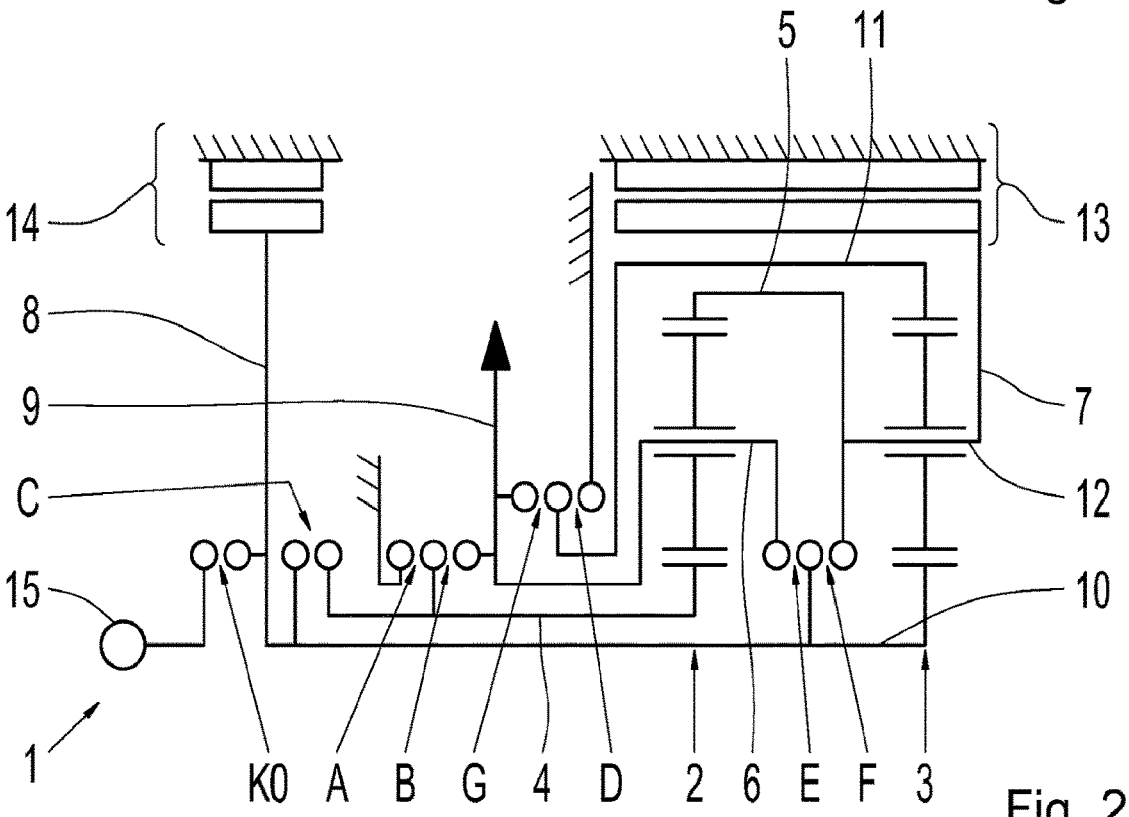
FIG. 2 shows a schematic diagram of a second embodiment of a drive system of a motor vehicle.
Figure 12:
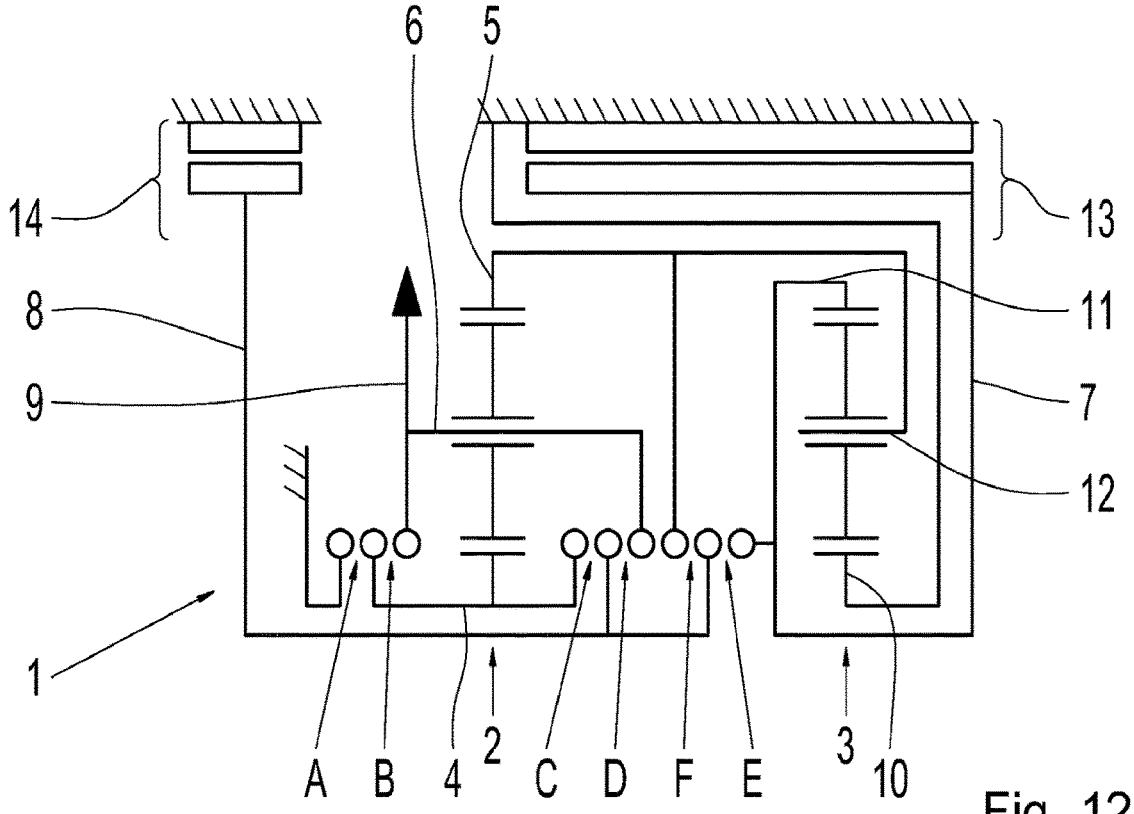
FIG. 12 shows a schematic diagram of a ninth embodiment of a drive system of a motor vehicle.
Figure 13:
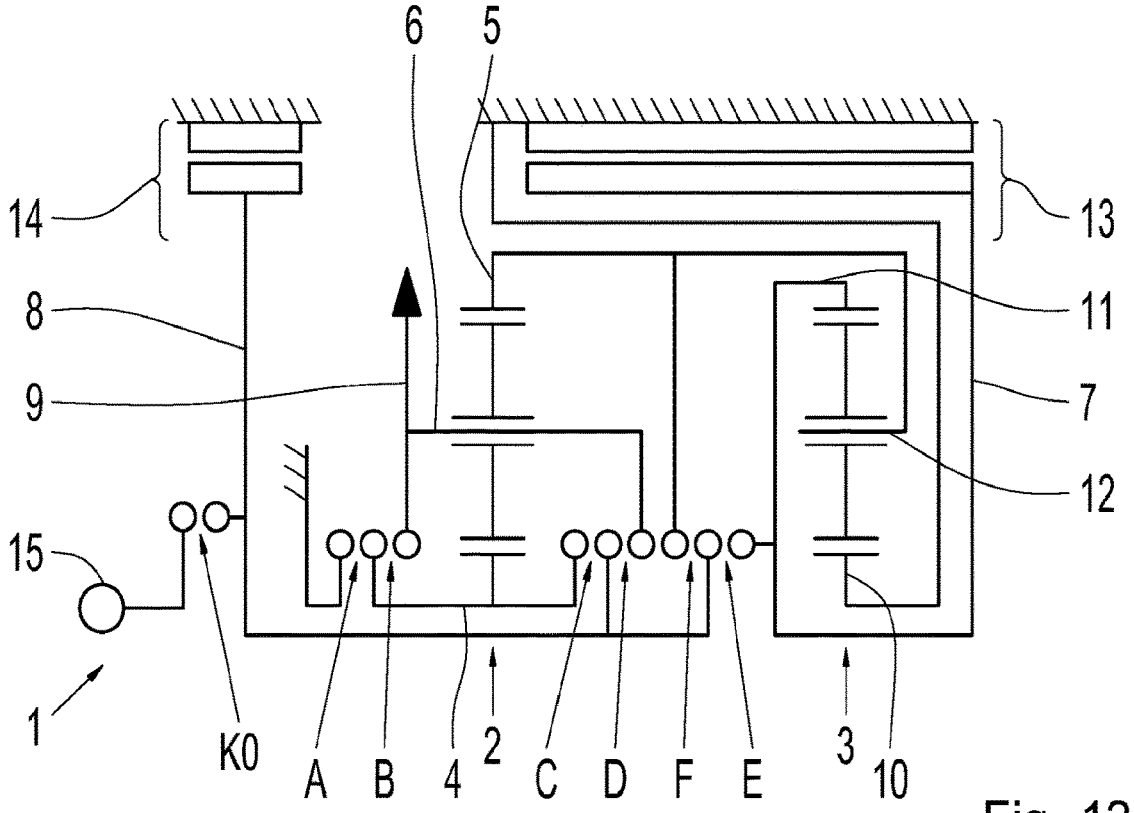
FIG. 13 shows a schematic diagram of a tenth embodiment of a drive system of a motor vehicle.

In the exemplary embodiment from FIGS. 1, 2, 12, and 13, the first electric machine 13 is indirectly coupled to the ring gear 5 of the first planetary gear set 2 via the second planetary gear set 3 and, in fact, in FIGS. 1 and 2, the first electric machine 13 engages on a carrier 12 of the second planetary gear set 3, which is coupled to the ring gear 5 of the first planetary gear set 2. In FIGS. 12 and 13, however, the first electric machine 13 is coupled to a ring gear 11 of the second planetary gear set 3 and the ring gear 5 of the first planetary gear set 2 is coupled to the carrier 12 of the second planetary gear set 3.

In addition to the first electric machine 13, the drive system includes the second electric machine 14. The second electric machine 14 is coupleable to the sun gear 4 of the first planetary gear set 2 either directly via a third form-fit or positively locking shift element C or indirectly via the second planetary gear set 3.

In FIGS. 1, 2, 4, 5, 7, 8, 12, and 13, the second electric machine 14 is directly coupled to the sun gear 4 of the particular first planetary gear set 2 when the third form-fit shift element C is engaged.

Figure 9:
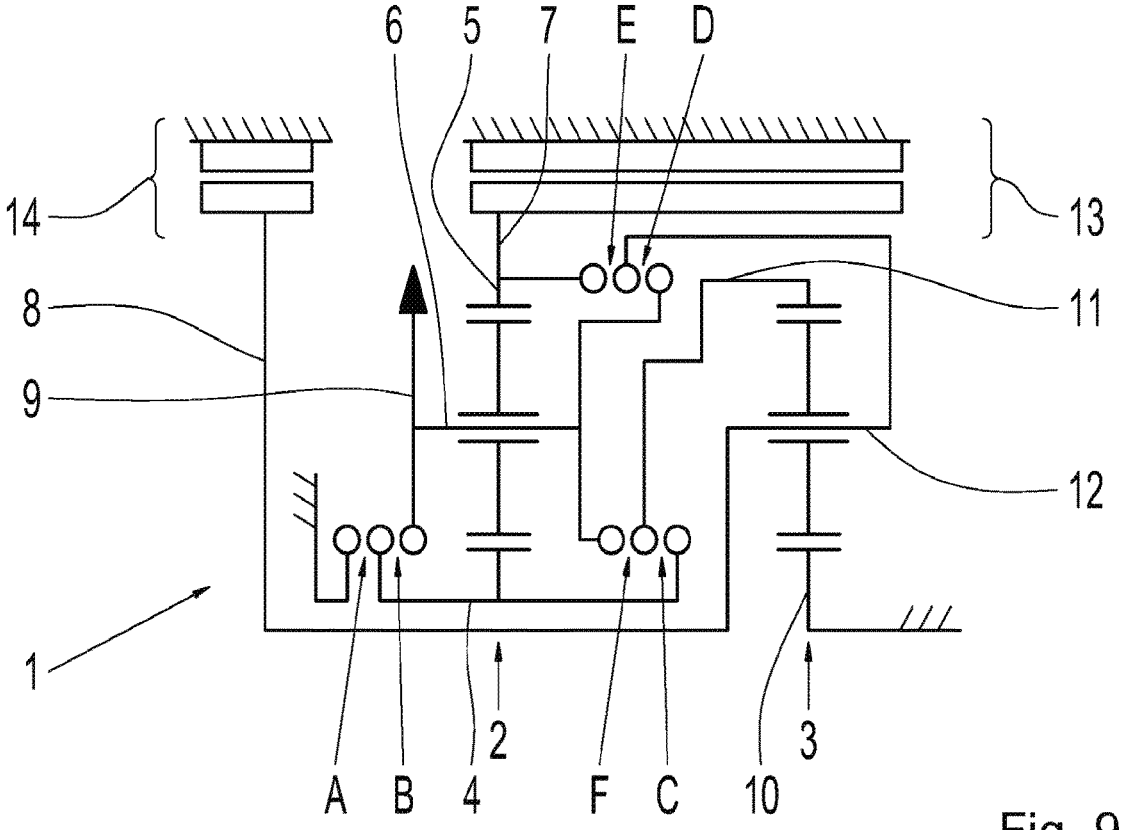
FIG. 9 shows a schematic diagram of a seventh embodiment of a drive system of a motor vehicle.
Figure 10:
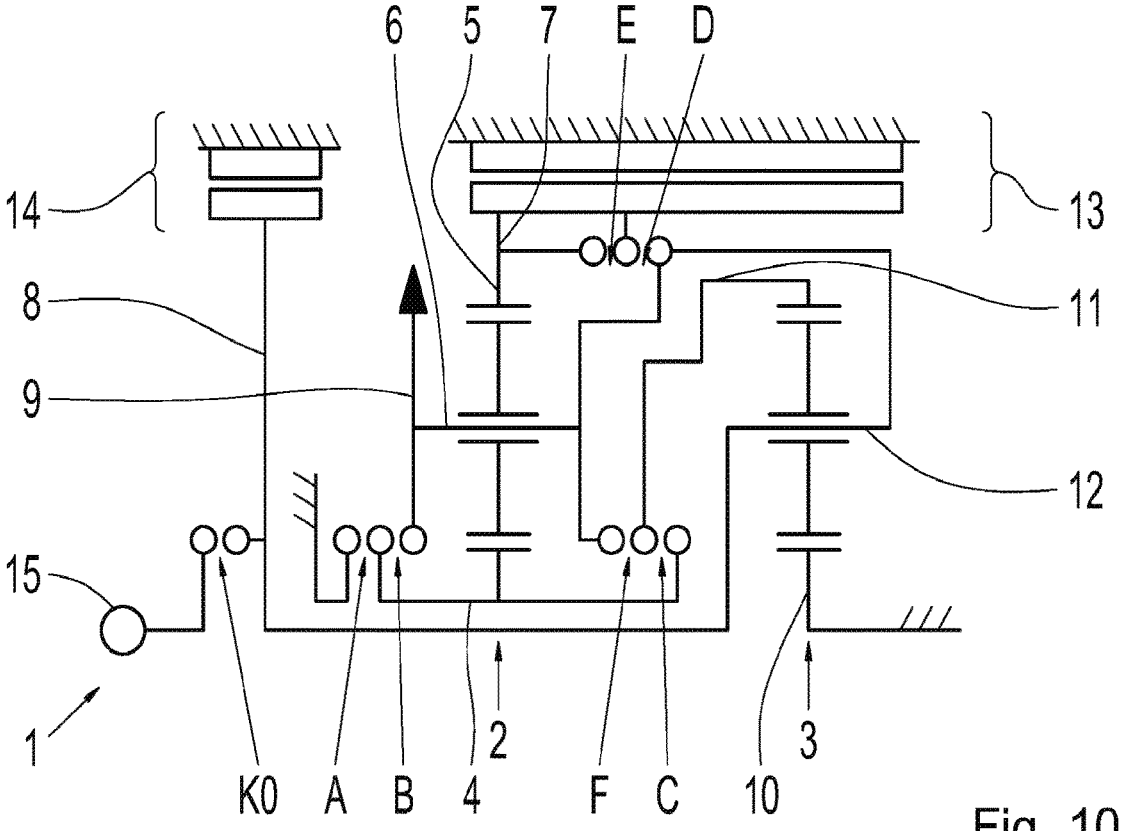
FIG. 10 shows a schematic diagram of an eighth embodiment of a drive system of a motor vehicle.

In FIGS. 9 and 10, however, when the third form-fit shift element C is engaged, the second electric machine 14 is coupled to the sun gear 4 of the first planetary gear set 2 via the second planetary gear set 3, namely in that, in FIGS. 9 and 10, the second electric machine 14 is coupled to the carrier 12 of the second planetary gear set 3, wherein, when the third form-fit shift element C is engaged, the ring gear 11 of the second planetary gear set 3 is coupled to the sun gear 4 of the first planetary gear set 2.

Moreover, a feature common to all embodiments of the drive system 1 from FIGS. 1, 2, 4, 5, 7 to 10 and 12, 13 is that two input shafts 7, 8 and one output shaft, the output shaft 9, are present. The first electric machine 13 is coupled to a first input shaft 7 of the two input shafts. The second electric machine 14 is coupled to a second input shaft 8 of the two input shafts. The output shaft 9 is coupled to a driven end which is not shown.

The carrier 6 of the first planetary gear set 2 is fixedly coupled to the output shaft 9 in each embodiment. The ring gear 5 of the first planetary gear set 2 is coupled, in each embodiment, to the first input shaft 7 and, therefore, to the first electric machine 13 and, in fact, as mentioned above, indirectly via the second planetary gear set 3 in FIGS. 1, 2, 12, and 13, and directly in FIGS. 4, 5, 7, 8, 9, and 10.

For the case in which the drive system 1 includes the optional, although preferred, second planetary gear set 3, the second electric machine 14 is either fixedly coupled to a rotary element of the second planetary gear set 3 or, alternatively, coupleable to a rotary element of the second planetary gear set 3 depending on the shift position of at least one further form-fit shift element, a fifth form-fit or positively locking shift element E or a sixth form-fit or positively locking shift element F. For example, in FIGS. 1 and 2, the second electric machine 14 is fixedly coupled to the sun gear 10 of the second planetary gear set 3. In FIGS. 4, 5, 7, 8, 9, and 10 the second electric machine 14 is fixedly coupled to the carrier 12 of the second planetary gear set 3. In FIGS. 12 and 13, the second electric machine 14 is coupleable either to the carrier 12 of the second planetary gear set 3 or to the ring gear 11 of the second planetary gear set 3 depending on the shift position of the form-fit shift elements F and E. For the case in which, in FIGS. 12 and 13, the sixth form-fit shift element F is engaged, the second electric machine 14 is coupled to the carrier 12 of the second planetary gear set 3. On the other hand, for the case in which, in FIGS. 12 and 13, the fifth form-fit shift element E is engaged, the second electric machine 14 is coupled to the ring gear 11 of the second planetary gear set 3.

In the embodiments of the drive system 1 shown in FIGS. 1 and 2, for the case in which the fifth form-fit shift element E is engaged, the carrier 6 of the first planetary gear set 2 is coupled to the sun gear 10 of the second planetary gear set 3. On the other hand, for the case in which the sixth form-fit shift element F in FIGS. 1 and 2 is engaged, the ring gear 5 of the first planetary gear set 2 is coupled to the sun gear 10 of the second planetary gear set 3.

Via the two form-fit shift elements G and D, in FIGS. 1 and 2, the ring gear 11 of the second planetary gear set 3 is coupled either to the output shaft 9 when a seventh form-fit or positively locking shift element G is engaged or is braked against the housing when a fourth form-fit or positively locking shift element D is engaged.

While the embodiment of drive system 1 from FIG. 1 is a purely electric drive system, the embodiment of the drive system 1 from FIG. 2 is a hybrid drive system which includes, in addition to the first and second electric machines 13, 14, an internal combustion engine 15 which is coupled to the second input shaft 8 of the drive system when the clutch K0 is engaged.

FIG. 3 shows a shift pattern for the embodiments of the drive system 1 from FIGS. 1 and 2, without taking the clutch K0 or the internal combustion engine 15 into account. The shift elements engaged in a particular gear ratio are marked with an X in the shift pattern from FIG. 3.

Gear ratios 1 to ZG2 are gear ratios for the second electric machine 14, and for the embodiment of the drive system 1 from FIG. 2, the clutch K0 is engaged, for the internal combustion engine 15. Gear ratios 4.1 to 4.11 are variants of a fourth gear ratio.

First and second gear ratios ZG1 and ZG2 are auxiliary gear ratios.

First and second purely electric gear ratios E1 and E2 are gear ratios for the first electric machine 13. The shift conditions EDA-V and EDA-R relate to an electrodynamic starting operation in the forward direction and in the reverse direction, respectively.

The second electric machine 14, which, in FIGS. 1 and 2, is coupled directly to the sun gear 10 of the second planetary gear set 3, is also connectable to the sun gear 10 of the second planetary gear set 3 via an intermediate connection of one further planetary gear set or a spur gear stage. Correspondingly, the first electric machine 13 is also connectable to the carrier 12 of the second planetary gear set 3 in FIGS. 1 and 2 via further transmission ratio steps. As mentioned above, the gear ratios 1 to ZG2 relate to gear ratios for the second electric machine 14 and/or the internal combustion engine 15. The first and second purely electric gear ratios E1 and E2 are gear ratios for the first electric machine 13.

In the first purely electric gear ratio E1 for the first electric machine 13, according to FIG. 3, the first form-fit shift element A is engaged. In FIGS. 1 and 2, the sun gear 4 of the first planetary gear set 2 is then braked against the housing. The carrier 6 of the second planetary gear set 2 is coupled to the output shaft 9, and the electric machine 13 is connected to the ring gear 5 of the first planetary gear set 2.

For the case in which the second purely electric gear ratio E2 for the first electric machine 3 is operative, the second form-fit shift element B is engaged, wherein the sun gear 4 of the first planetary gear set 2 is then connected, while providing direct drive for the first planetary gear set 2, to the carrier 6 of the first planetary gear set 2 and is then connected, together with the carrier 6, to the output shaft 9. When the first planetary gear set 2 is interlocked, there is equality of rotational speed between the sun gear 4, the ring gear 5, and the carrier 6 of the planetary gear set 2.

The methods described in the following, by way of example, for the embodiments of the drive system 1 from FIGS. 1, 2 relate to the implementation of a purely electric powershift (electronic speed sensor gear shift) for the first and second purely electric gear ratios E1, E2 of the first electric machine 13 while utilizing the first planetary gear set 2 as well as the first, second, and third form-fit shift elements A, B, C. Moreover, a method is provided for a purely electric starting operation (electrodynamic starting operation), once again with the involvement of the first planetary gear set 2 and the first, second, and third form-fit shift elements A, B, and C.

A first method relates to the implementation of an electric powershift during a purely electric driving operation, i.e., for the drive train from FIG. 2 with the internal combustion engine 15 decoupled, from a first electric gear ratio for the first electric machine 13 into a second electric gear ratio for the electric machine 13.

During implementation of a traction power upshift, an electronic speed sensor powershift from the first purely electric gear ratio E1 into the second purely electric gear ratio E2 takes place. During implementation of a coasting power downshift, an electronic speed sensor powershift from the second purely electric gear ratio E2 into the first purely electric gear ratio E1 takes place.

In any case, in order to implement an electronic speed sensor powershift, the second electric machine 14 is initially coupled via the third form-fit shift element C to the sun gear 4 of the first planetary gear set 2. For this purpose, the third form-fit shift element C is engaged.

Thereafter, a form-fit shift element to be disengaged for the powershift is unloaded via the second electric machine 14. In the case of a traction power upshift from the first purely electric gear ratio E1 into the second purely electric gear ratio E2, the first form-fit shift element A is unloaded. During implementation of a coasting power downshift from the second purely electric gear ratio E2 into the first purely electric gear ratio E1, the second form-fit shift element B is unloaded. Subsequently, the form-fit shift element which is to be disengaged and which is unloaded via the second electric machine 14 is actually disengaged.

Thereafter, the form-fit shift element to be engaged for the powershift is synchronized. During the traction power upshift from the first purely electric gear ratio E1 into the second purely electric gear ratio E2, the second form-fit shift element B is synchronized. During the coasting power downshift from the second purely electric gear ratio E2 into the first purely electric gear ratio E1, the first form-fit shift element A is synchronized. Subsequent thereto, the form-fit shift element to be engaged for the powershift is engaged.

Further details are described individually in the following for the powershifts.

The implementation of a purely electric electronic speed sensor powershift from the first purely electric gear ratio E1 into the second purely electric gear ratio E2 of the first electric machine 13 while providing a traction power upshift is based on the assumption, in a starting situation, that the driving is taking place purely electrically via the first electric machine 13 in the first purely electric gear ratio E1 of the shift pattern from FIG. 3 with the form-fit shift element A engaged, and the first electric machine 13 provides a positive drive torque. Subsequently, a purely electric powershift from the first purely electric gear ratio E1 into the second purely electric gear ratio E2 of the shift pattern from FIG. 3 is to take place, wherein, in the following, it is assumed, for simplicity, that the desired drive power and the ground speed remain approximately constant during the gear shift to be implemented.

In order to prepare for the electronic speed sensor powershift from the first purely electric gear ratio E1 into the second purely electric gear ratio E2, the second electric machine 14 is initially coupled to the sun gear 4 of the first planetary gear set 2 via the third form-fit shift element C.

The synchronization of the third form-fit shift element C takes place, in this case, via a closed-loop control of the rotational speed of the second electric machine 14; in this case by way of a deceleration to a rotational speed of zero or approximately zero.

After the second electric machine 14 has been coupled to the sun gear 4 of the first planetary gear set 2 by way of the engagement of the third form-fit shift element C, the first form-fit shift element A, which to be disengaged for the electronic speed sensor powershift from the first purely electric gear ratio E1 into the second purely electric gear ratio E2 to be implemented, is unloaded via the second electric machine 14 applying appropriate torque. The third form-fit shift element C is loaded to a greater extent in this case.

After the first form-fit shift element A has been unloaded via the second electric machine 14, the first form-fit shift element A to be disengaged is actually disengaged, in that the double shift element, which includes the first and second form-fit shift elements A, B, is transferred into a neutral position, and so both of the first and second form-fit shift elements A, B are then disengaged.

Thereafter, the second form-fit shift element B, which is to be engaged for the electronic speed sensor powershift from the first purely electric gear ratio E1 into the second purely electric gear ratio E2 to be implemented, is synchronized by an appropriate closed-loop control of the first and second electric machines 13 and 14. For this purpose, the torque of the first electric machine 13 is reduced and, if necessary, the torque of the second electric machine 14 increased in such a way that the total power provided by the first and second electric machines 13 and 14 remains constant or approximately constant.

For this purpose, the first planetary gear set 2 is brought into direct drive, i.e., an equality of rotational speed is established at the sun gear 4, the carrier 6, and the ring gear 5 of the first planetary gear set 2, wherein, after synchronization of the second form-fit shift element B to be engaged, the second form-fit shift element B is engaged and the planetary gear set 2 is brought into direct drive. The actual powershift from the first purely electric gear ratio E1 into the second purely electric gear ratio E2 is then concluded.

Subsequently, optionally, the torque at the second electric machine 14 is reduced in order to load the second form-fit shift element B, wherein the torque of the first electric machine 13 is then simultaneously increased in order to hold the drive power approximately constant. After the third form-fit shift element C has been unloaded, the third form-fit shift element C is disengaged without load and, in this way, makes the second electric machine 14 available for other functions.

In the above-described implementation of an electronic speed sensor traction power upshift from the first purely electric gear ratio E1 into the second purely electric gear ratio E2 from the shift pattern from FIG. 3 of the first electric machine 13, the advantage is given that the first electric machine 13 contributes the greatest portion of the drive power during the gear shift and, therefore, the second electric machine 14 is of relatively small proportions.

For the case in which the stationary transmission ratio i0 of the first planetary gear set 2 is selected to be "−2", the first electric machine 13 makes two-thirds of the drive power available, in direct drive, and the second electric machine 14 makes one-third of the drive power available, shortly before the engagement of the form-fit shift element B.

At the sun gear 4 of the planetary gear set 2, the torque is then only half as great as at the ring gear 5 of the first planetary gear set 2. The second electric machine 14 can then have less power and less torque than the first electric machine 13.

Details of a purely electric electronic speed sensor coasting power downshift from the second purely electric gear ratio E2 into the first purely electric gear ratio E1 of the shift pattern from FIG. 3 are described in the following. In a starting situation of the drive system, it is assumed that driving is taking place purely electrically via the first electric machine 13, i.e., with the second form-fit shift element B engaged and during the braking operation with recuperation. Originating from this starting situation, a purely electric coasting power downshift from the second purely electric gear ratio E2 from FIG. 3 into the first purely electric gear ratio E1 from FIG. 3 is to take place, wherein, once again, it is assumed, for the sake of simplicity, that the desired braking power and the ground speed remain approximately constant during the implementation of the coasting power downshift.

In order to prepare for the coasting power downshift to be implemented, initially, once again, the third form-fit shift element C is engaged in order to couple the second electric machine 14 to the sun gear 4 of the first planetary gear set 2.

It is definitely possible, however, that the second electric machine 14 has already been coupled to the sun gear 4, with the third form-fit shift element C engaged. If the third form-fit shift element C must be engaged and, for this purpose, must be synchronized, this synchronization takes place, once again, by way of a closed-loop control of the rotational speed of the second electric machine 14.

After the second electric machine 14 has been coupled to the sun gear 4 of the first planetary gear set 2 by engagement of the third form-fit shift element C, the second electric machine 14 then applies so much torque that the second form-fit shift element B, which is to be disengaged for the coasting power downshift to be implemented, is unloaded.

Subsequently, the second form-fit shift element B is disengaged without load, namely by transferring the double shift element including the shift elements A and B into a neutral position. When the second form-fit shift element B is unloaded, the third form-fit shift element C is loaded.

Following the disengagement of the second form-fit shift element B, the first form-fit shift element A, which is to be engaged for the coasting power downshift to be implemented, is synchronized and, in fact, via a closed-loop control of the two electric machines 13 and 14.

For this purpose, during the implementation of a coasting power downshift, the sun gear 4 of the first planetary gear set 2 is decelerated to a rotational speed of zero or approximately zero. In so doing, the magnitude of the torque of the first electric machine 13 is reduced and, if necessary, the magnitude of the torque of the second electric machine 14 is increased. Both electric machines 13 and 14 then operate in a braking manner. During this rotational-speed adaptation phase, the total power made available by the two electric machines 13 and 14 remains constant or approximately constant.

After the synchronization of the first form-fit shift element A, the same is engaged. The actual coasting power downshift from the second purely electric gear ratio E2 into the first purely electric gear ratio E1 is then concluded.

Subsequently, it is optionally possible, although recommended, to decouple the second electric machine 14, since the second electric machine 14 would otherwise remain braked. In order to decouple the second electric machine 14 from the sun gear 4 of the first planetary gear set 2, torque at the second electric machine 14 is reduced; in this case, the first form-fit shift element A is loaded and the third form-fit shift element C is unloaded, and so the third form-fit shift element C is subsequently disengaged without load. The second electric machine 14 is then utilized for other functions.

Since the electric machines 13 and 14 can generate a positive torque as well as a negative torque, the aforementioned coasting power downshift is implemented, particularly advantageously, during the recuperation.

It is also possible, of course, to implement traction power downshifts from the second purely electric gear ratio E2 into the first purely electric gear ratio E1 as well as coasting power upshifts from the first purely electric gear ratio E1 into the second purely electric gear ratio E2 from FIG. 3. Traction power downshifts as well as coasting power upshifts are less common than traction power upshifts and coasting power downshifts, however. For a traction power downshift to occur, a driving situation would have to be present, in which the motor vehicle slows down despite the presence of drive torque, for example, during steep uphill travel. For a coasting power downshift to occur, a driving situation would have to be present, in which the motor vehicle speeds up despite the presence of brake torque, for example, during steep downhill travel.

The traction power downshift as well as the coasting power upshift are identical with regard to their basic mode of operation in the two aforementioned types of gear shifts, although with the difference that the particular torque acts in another direction.

Details of a purely electric starting operation are described in the following, wherein the purely electric starting operation is also referred to as an electrodynamic starting operation. The purely electric electrodynamic starting operation is described in the following for the forward direction of travel, i.e., for the EDA-V operating condition from the shift pattern of FIG. 3.

In order to prepare for a purely electric starting operation, in the forward direction of travel in this case, the second electric machine 14 is initially connected to the first planetary gear set 2 via engagement of the third form-fit shift element C. A required synchronization of the third form-fit shift element C takes place via a closed-loop control of the rotational speed of the second electric machine 14, in this case by decelerating the second electric machine 14 to a rotational speed of zero or approximately zero while the vehicle is at a standstill and the first electric machine 13 is at a standstill.

Thereafter, the second electric machine 14 is brought to a minimum rotational speed in a mode of closed-loop control of the rotational speed, rotating in reverse. In so doing, a good efficiency for the second electric machine 14 is ensured. When the carrier 6 of the first planetary gear set 2 then stands still, the first electric machine 13 automatically rotates in the forward direction without load.

The rotational speed of the second electric machine 14 is preferably selected in such a way that the second electric machine 14 as well as the first electric machine 13 have a minimum rotational speed. The minimum rotational speeds are selected in such a way that there is a good efficiency for both electric machines 13 and 14 as soon as torque is demanded for the purely electric starting operation.

For the case in which a torque is demanded for the purely electric starting operation, i.e., the starting operation is to take place purely electrically, a torque is applied at the ring gear 5 of the first planetary gear set 2 via the first electric machine 13, and so the desired starting torque is present at the carrier 6 of the first planetary gear set 2.

The second electric machine 14, which is operated in the mode of closed-loop control of the rotational speed, supports this torque at the sun gear 4 of the first planetary gear set 2.

Since the first and second electric machines 13, 14 do not stand still, but rather rotate at a minimum rotational speed, unfavorable operating points with high torque and a low rotational speed as well as an intense heating-up of the particular electric machines as well as an inverter are avoided. Both the first and second electric machines 13, 14 are operated at an advantageous operating point.

As the ground speed increases during a purely electric electrodynamic starting operation, the rotational speed increases at the carrier 6 of the first planetary gear set 2. The rotational speed of the second electric machine 14 is adapted in order to continue to ensure favorable rotational speed conditions at the two electric machines 13 and 14.

If the first purely electric gear ratio E1 for the first electric machine 13 is to be engaged originating from the purely electric electrodynamic starting operation, however, the rotational speed of the second electric machine 14 is brought to zero or approximately zero in order to synchronize the first form-fit shift element A. Subsequently, the first form-fit shift element A is engaged in order to engage the first purely electric gear ratio E1 from FIG. 3.

The torque of the second electric machine 14 is reduced, then the first form-fit shift element A automatically takes over the supporting torque at the sun gear 4 of the planetary gear set 2. Since a rotational speed of zero or approximately zero for the second electric machine 14 is only intermittently present, there is no risk of overheating. The third form-fit shift element C is disengaged without load. The second electric machine 14 is then utilized for other functionalities.

The advantage of the above-described purely electric electrodynamic starting operation, in particular, is that driving takes place with high torque and low ground speeds for a longer time without a risk that the electric machines or inverters will overheat.

Although it is theoretically possible to utilize a closed-loop control of the rotational speed for the first electric machine 13 and to support torque at the sun gear 4 of the first planetary gear set 2 via the first electric machine 13, the above-described distribution of roles between the first and second electric machines 13, 14 is preferred in the case of an electrodynamic starting operation. By utilizing the above-described distribution of roles between the first and second electric machines 13, 14 during the electrodynamic starting operation, the first electric machine 13 is operated in the torque mode during the electrodynamic starting operation as well as subsequently when the first purely electric gear ratio E1 is engaged. Therefore, during the changeover from the purely electric starting operation into the first purely electric gear ratio E1 for the first electric machine 13, a changeover from a closed-loop control of the rotational speed and a closed-loop control of the torque are not necessary.

Since both of the first and second electric machines 13, 14 can change the direction of rotation as well as the sign of the torque, the above-described method is also usable for the electrodynamic starting operation in the reverse direction (see EDA-R condition from FIG. 3).

It is also possible to drive purely electrically using both of the first and second electric machines 13, 14, wherein, in this case, one of the first and second form-fit shift elements A and B and, furthermore, one of the fourth, fifth, sixth, or seventh form-fit shift elements D, E, F, G is engaged.

During a gear change for the second electric machine 14, traction is maintained via the first electric machine 13. During a gear change for the first electric machine 13, traction is maintained via the second electric machine 14 and, in fact, within the scope of the rating of the second electric machine 14.

As mentioned above, for the case in which the above-described electronic speed sensor powershifts or the above-described electrodynamic starting operation are/is to be utilized in the drive system from FIG. 2, the internal combustion engine 15 is decoupled by disengaging the clutch K0.

In the drive system from FIG. 2, the internal combustion engine 15 is started with the aid of the second electric machine 14, for the purpose of which the clutch K0 is engaged.

Moreover, in the drive system from FIG. 2, a power supply of the vehicle circuit or a power supply of the first electric machine 13 for so-called serial driving takes place with the aid of the second electric machine 14. For this purpose, the clutch K0 is also engaged, and the first form-fit shift element A is also engaged. For the first electric machine 13, the first purely electric gear ratio E1 is then engaged. The internal combustion engine 15 and the electric machine 14 have no mechanical connection to the driven end 9.

In the drive system from FIG. 2, the internal combustion engine 15 is supported with the aid of the second electric machine 14 during a synchronization of rotational speeds when gear ratios for the internal combustion engine 15 are to be changed with the clutch K0 engaged.

Figure 4:
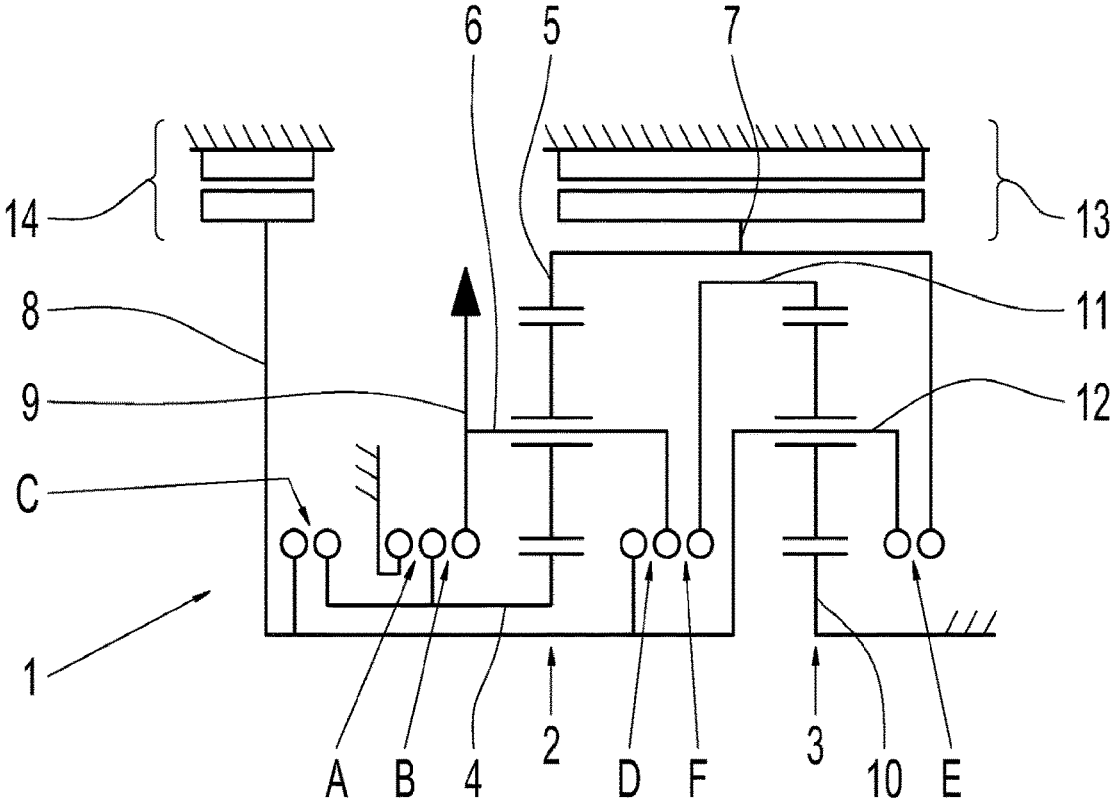
FIG. 4 shows a schematic diagram of a third embodiment of a drive system of a motor vehicle.
Figure 5:
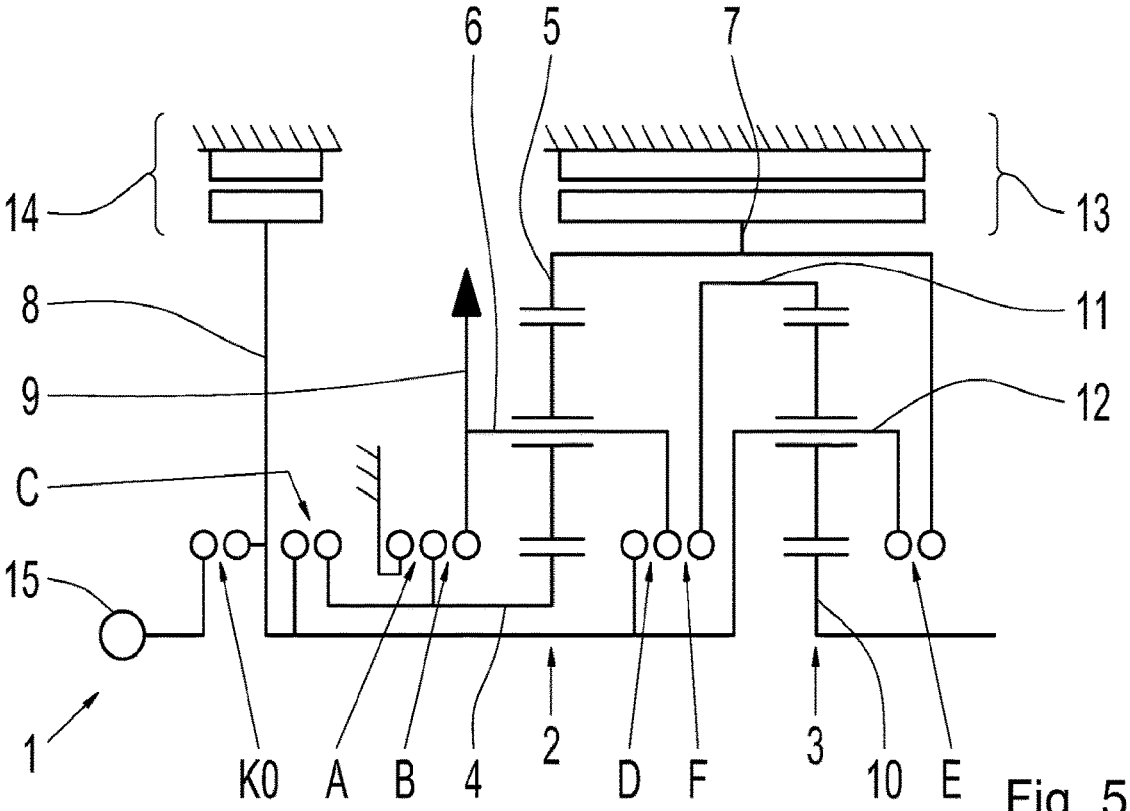
FIG. 5 shows a schematic diagram of a fourth embodiment of a drive system of a motor vehicle.

Embodiments of the drive system 1 from FIGS. 4 and 5 differ from the embodiments of the drive system 1 from FIGS. 1 and 2 by the direct connection, in FIGS. 4 and 5, of the first electric machine 13 to the ring gear 5 of the second planetary gear set 2 and by the incorporation of the second planetary gear set 3 into the drive system.

In FIGS. 4 and 5, when the fourth form-fit shift element D is engaged, the carrier 6 of the first planetary gear set 2 is coupled to the carrier 12 of the second planetary gear set 3. On the other hand, for the case in which the sixth form-fit shift element F in FIGS. 4 and 5 is engaged, the carrier 6 of the first planetary gear set 2 is coupled to the ring gear 11 of the second planetary gear set 3. For the case in which, in FIGS. 4 and 5, the fifth form-fit shift element E is engaged, the carrier 12 of the second planetary gear set 3 is coupled to the ring gear 5 of the first planetary gear set 2.

For the drive systems 1 from FIGS. 4 and 5, the gear ratios from the shift pattern from FIG. 6 are usable, wherein the gear ratios 2.1 through 2.7 are alternatives of second gear ratios for the second electric machine 14 and the gear ratios 3.1 through 3.4 are alternatives for a third gear ratio for the second electric machine 14. The first and second first purely electric gear ratios E1 and E2 are, once again, purely electric gear ratios for the first electric machine 13.

While, in the exemplary embodiment from FIGS. 1 to 3, four forward gear ratios as well as the first and second auxiliary gear ratios ZG1 and ZG2 are made available for the second electric machine 14 and, if necessary, the internal combustion engine 15, three forward gear ratios are made available in the exemplary embodiment from FIGS. 4 to 6. In the exemplary embodiments from FIGS. 4 and 5, an electrodynamic starting operation takes place in the forward direction via the EDA-V condition.

Figure 7:
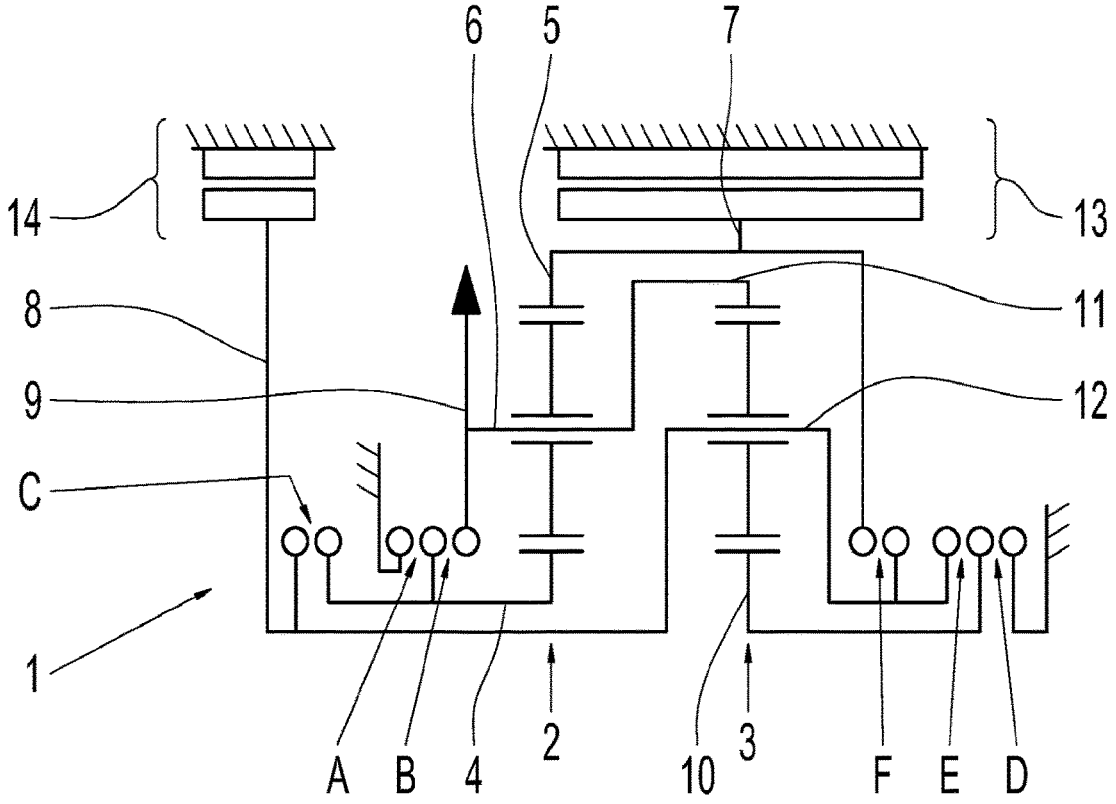
FIG. 7 shows a schematic diagram of a fifth embodiment of a drive system of a motor vehicle.
Figure 8:
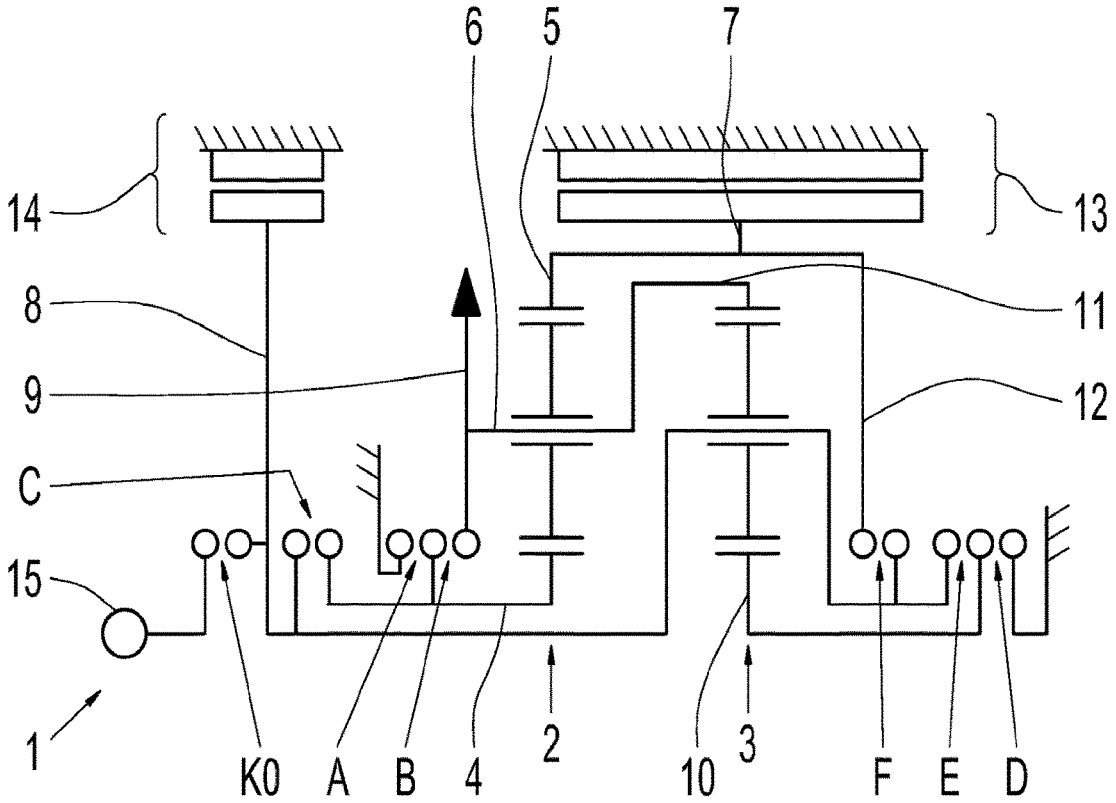
FIG. 8 shows a schematic diagram of a sixth embodiment of a drive system of a motor vehicle.

The shift pattern from FIG. 6 also applies to the embodiments of the drive system 1 from FIGS. 7 and 8. The embodiments of the drive system 1 from FIGS. 7 and 8 differ from the embodiments of the drive system 1 from FIGS. 4 and 5 by the incorporation of the second planetary gear set 3 into the drive system. In FIGS. 7 and 8, when the sixth form-fit shift element F is engaged, the carrier 12 of the second planetary gear set 3 is coupled to the ring gear 5 of the first planetary gear set 2. When the fifth form-fit shift element E is engaged, the carrier 12 of the second planetary gear set 3 is coupled to the sun gear 10 thereof. On the other hand, when the fourth form-fit shift element D is engaged, the sun gear 10 of the second planetary gear set 3 is braked against the housing.

In the embodiments of the drive system 1 from FIGS. 4, 5, 7, and 8, each of which utilizes the shift pattern from FIG. 6, the electronic speed sensor powershifts described with reference to the exemplary embodiments from FIGS. 1 to 3 as well as the purely electric electrodynamic starting operation in the forward direction of travel are utilized. The first, second, and third form-fit shift elements A, B, C as well as the first planetary gear set 2 are involved in the method.

FIGS. 9 and 10 show further embodiments of the drive system 1, in which the above-described methods are usable in an identical manner. Once again, the first, second, and third form-fit shift elements A, B, C as well as the first planetary gear set 2 are involved in the method. The embodiments of the drive system 1 from FIGS. 9 and 10 utilize the shift pattern from FIG. 11.

In the embodiments of the drive system 1 from FIGS. 9 and 10, the first electric machine 13 is once again directly coupled to the ring gear 5 of the first planetary gear set 2. The carrier 6 of the first planetary gear set 2 is coupled to different assemblies of the drive system depending on the shift position of the shift elements B, D, and F. When the second form-fit shift element B is engaged, the carrier 6 of the first planetary gear set 2 is coupled to the sun gear 4 of the first planetary gear set 2. When the fourth form-fit shift element D is engaged, the carrier 6 of the first planetary gear set 2 is coupled to the carrier 12 of the second planetary gear set 3. When the sixth form-fit shift element F is engaged, the carrier 6 of the first planetary gear set 2 is coupled to the ring gear 11 of the second planetary gear set 3. For the case in which the third form-fit shift element C is engaged, the ring gear 11 of the second planetary gear set 3 is coupled to the sun gear 4 of the first planetary gear set 2.

According to FIG. 11, the gear ratios 1 to 3 as well as the auxiliary gear ratio ZG are made available for the second electric machine 14 and, if necessary, for the internal combustion engine 15, wherein the alternatives 2.1 to 2.5 exist for the second gear ratio and the alternatives 3.1 to 3.5 exist for the third gear ratio. The first and second first purely electric gear ratios E1 and E2 as well as the EDA-V condition for a purely electric starting operation in the forward direction are made available for the first electric machine 13.

The above-described electronic speed sensor powershifts as well as the above-described electrodynamic starting operation in the forward direction are utilized in an identical manner with the embodiments of the drive system 1 from FIGS. 9 and 10.

The described electronic speed sensor powershifts as well as the described electrodynamic starting operation in the forward direction are also utilized in the embodiments of the drive system 1 from FIGS. 12 and 13, which utilize the shift pattern from FIG. 14. In the case of the embodiment of the drive system from FIGS. 12 and 13, three forward gear ratios are made available for the second electric machine 14 and, if necessary, for the internal combustion engine 15; the first and second purely electric gear ratios E1 and E2 as well as the EDA-V operating condition are utilized for the first electric machine 13.

In the case of the embodiment of the drive system 1 from FIGS. 12 and 13, the first electric machine 13 is not coupled directly to the ring gear 5 of the first planetary gear set 2, but rather indirectly via a fixed pre-ratio which is made available by the second planetary gear set 3. The sun gear 10 of the second planetary gear set 3 is fixedly connected to the housing. The ring gear 11 of the second planetary gear set 3 is coupled to the input shaft 7. The carrier 12 of the second planetary gear set 3 is connected to the ring gear 5 of the first planetary gear set 2. When the fifth form-fit shift element E is engaged, the ring gear 11 of the second planetary gear set 3 is coupled to the second electric machine 14. When the sixth form-fit shift element F is engaged, the carrier 12 of the second planetary gear set 3 and the ring gear 5 of the first planetary gear set 2 are coupled to the second electric machine 14. When the fourth form-fit shift element D is engaged, the carrier 6 of the first planetary gear set 2 is coupled to the second electric machine 14.

Modifications and variations can be made to the embodiments illustrated or described herein without departing from the scope and spirit of the invention as set forth in the appended claims.

REFERENCE CHARACTERS

1 drive system
2 first planetary gear set
3 second planetary gear set
4 sun gear of the first planetary gear set
5 ring gear of the first planetary gear set
6 carrier of the first planetary gear set
7 first input shaft
8 second input shaft
9 output shaft
10 sun gear of the second planetary gear set
11 ring gear of the second planetary gear set
12 carrier of the second planetary gear set
13 first electric machine
14 second electric machine
15 internal combustion engine
A first form-fit shift element
B second form-fit shift element
C third form-fit shift element
D fourth form-fit shift element
E fifth form-fit shift element
F sixth form-fit shift element
G seventh form-fit shift element
K0 clutch

The invention claimed is:

1. A method for operating a drive system (1) of a motor vehicle, the drive system (1) comprising a first planetary gear set (2) including a sun gear (4), a ring gear (5), and a carrier (6), the sun gear (4) of the first planetary gear set (2) being brakeable against a housing via a first form-fit shift element (A), and [the sun gear (4) of the first planetary gear set (2) being coupleable to the carrier (6) of the first planetary gear set (2) via] a second form-fit shift element (B) [while providing] *being engageable to provide* a direct drive at the first planetary gear set (2), the drive system (1) further comprising a first electric machine (13) coupled to the ring gear (5) of the first planetary gear set (2) either directly or indirectly via a second planetary gear set (3), the drive system (1) additionally comprising a second electric machine (14) either directly coupleable to the sun gear (4) of the first planetary gear set (2) via *engagement of* a third form-fit shift element (C) or indirectly coupleable to the sun gear (4) of the first planetary gear set (2) via the second planetary gear set (3) *and engagement of the third form-fit shift element* (*C*), wherein for implementing a powershift, during a purely electric driving operation, from a first gear ratio for the first electric machine (13) into a second gear ratio for the first electric machine (13), the method comprises:

initially coupling the second electric machine (14) to the sun gear (4) of the first planetary gear set (2) via the third form-fit shift element (C);

thereafter unloading one of the first form-fit shift element (A) [and] *or* the second form-fit shift element (B) to be disengaged for the powershift via the second electric machine (14);

subsequently disengaging the one of the first form-fit shift element (A) [and] *or* the second form-fit shift element (B) to be disengaged for the powershift;

subsequently synchronizing [another] *a different one* of the first form-fit shift element (A) [and] *or* the second form-fit shift element (B) to be engaged for the powershift; and subsequently engaging the [other] *different one* of the first form-fit shift element (A) [and] *or* the second form-fit shift element (B) to be engaged for the powershift.

2. The method of claim 1, wherein, when the powershift is a traction power upshift, the one of the first form-fit shift element (A) [and] *or* the second form-fit shift element (B) to be unloaded and subsequently disengaged is the first form-fit shift element (A), and the [other] *different one* of the first form-fit shift element (A) [and] *or* the second form-fit shift element (B) to be synchronized and subsequently engaged is the second form-fit shift element (B)[, the second form-fit shift element (B) being synchronized and subsequently engaged via direct drive at the first planetary gear set (2)].

3. The method of claim 2, wherein synchronizing the second form-fit shift element (B) to be engaged comprises reducing a torque applied by the first electric machine (13) and increasing a torque applied by the second electric machine (14) such that the total power applied by the first and second electric machines (13, 14) remains constant or approximately constant.

4. The method of claim 1, wherein, when the powershift is a coasting power downshift, the one of the first form-fit shift element (A) [and] *or* the second form-fit shift element (B) to be unloaded and subsequently disengaged is the second form-fit shift element (B), the [other] *different one* of the first form-fit shift element (A) [and] *or* the second form-fit shift element (B) to be synchronized and subsequently engaged is the first form-fit shift element (A), the first form-fit shift element (A) being synchronized by decelerating the sun gear (4) of the first planetary gear set (2) to a rotational speed of zero or approximately zero and being subsequently engaged.

5. The method of claim 4, wherein synchronizing the first form-fit shift element (A) to be engaged comprises reducing the magnitude of a torque applied by the first electric machine (13) and increasing the magnitude of a torque applied by the second electric machine (14) such that the total power applied by the first and second electric machines (13, 14) remains constant or approximately constant.

6. The method of claim 1, further comprising decoupling the second electric machine (14) from the sun gear (4) of the first planetary gear set (2) via the third form-fit shift element (C) subsequent to the engagement of the [other] *different one* of the first form-fit shift element (A) [and] *or* the second form-fit shift element (B) to be engaged for the powershift.

7. The method of claim 1, further comprising, [when the drive system (1) comprises an internal combustion engine (15) in addition to the first and second electric machines (13, 14),], *for implementing the powershift*, decoupling [the] *an* internal combustion engine (15) *of the drive system* (*1*), maintaining the internal combustion engine (15) decoupled, or both decoupling the internal combustion engine (15) and maintaining the internal combustion engine (15) decoupled.

8. The method of claim 1, wherein, [when] the drive system (1) comprises the second planetary gear set (3) in addition to the first planetary gear set (2) and at least one further form-fit shift element (E, F) in addition to the first, second, and third form-fit shift elements (A, B, C), the second electric machine (14) is either fixedly connected to a rotary element of the second planetary gear set (3) or is coupleable to a rotary element of the second planetary gear set (2) via the at least one further form-fit shift element (E, F).

9. A method for operating a drive system (1) of a motor vehicle, the drive system (1) comprising a first planetary gear set (2) including a sun gear (4), a ring gear (5), and a carrier (6), the sun gear (4) of the first planetary gear set (2) being brakeable against a housing via a first form-fit shift element (A), and [the sun gear (4) of the first planetary gear set (2) being coupleable to the carrier (6) of the first planetary gear set (2) via] a second form-fit shift element (B) [while providing] *being engageable to provide* a direct drive at the first planetary gear set (2), the drive system (1) further comprising a first electric machine (13) coupled to the ring gear (5) of the first planetary gear set (2) either directly or indirectly via a second planetary gear set (3), the drive system (1) additionally comprising a second electric machine (14) either directly coupleable to the sun gear (4) of the first planetary gear set (2) via *engagement of* a third form-fit shift element (C) or indirectly coupleable to the sun gear (4) of the first planetary gear set (2) via the second planetary gear set (3) *and engagement of the third form-fit shift element* (*C*), wherein, for the purely electric starting operation, the method comprises:

initially coupling the second electric machine (14) to the sun gear (4) of the first planetary gear set (2) via the third form-fit shift element (C); and thereafter applying, during or after the presence of a demand for a starting torque, a torque at the ring gear (5) of the first planetary gear set (2) via the first electric machine (13), and operating the second electric machine (14) in a mode of closed-loop control mode of the rotational speed such that the second electric machine (14) supports the torque at the sun gear (4) of the first planetary gear set (2).

10. The method of claim 9, further comprising, when the starting speed increases and a first gear ratio is to be engaged for the first electric machine (4), initially bringing the rotational speed of the second electric machine (14) to zero or approximately zero in order to synchronize the first form-fit shift element (A) to be engaged for the first gear ratio;

subsequently engaging the first form-fit shift element (A) to be engaged; and thereafter reducing a torque applied by the second electric machine (14) and disengaging the third form-fit shift element (C) in order to decouple the second electric machine (14) from the sun gear (4) of the first planetary gear set (2).

11. The method of claim 10, further comprising, [when the drive system (1) comprises an internal combustion engine (15) in addition to the first and second electric machines (13, 14),] *for the purely electric starting operation,* decoupling [the] *an* internal combustion engine (15), *of the drive system* (*1*), maintaining the internal combustion engine (15) decoupled, or both decoupling the internal combustion engine (15) and maintaining the internal combustion engine (15) decoupled.

12. The method of claim 10, wherein, [when] the drive system (1) comprises the second planetary gear set (3) in addition to the first planetary gear set (2) and at least one further form-fit shift element (E, F) in addition to the first, second, and third form-fit shift elements (A, B, C), the second electric machine (14) is either fixedly connected to a rotary element of the second planetary gear set (3) or is coupleable to a rotary element of the second planetary gear set (2) via the at least one further form-fit shift element (E, F).

13. A drive system (1) of a motor vehicle, comprising:

a first planetary gear set (2) including a sun gear (4), a ring gear (5), and a carrier (6);

a first electric machine (13) directly coupled to the ring gear (5) of the first planetary gear set (2); and a second electric machine (14) either directly coupleable to the sun gear (4) of the first planetary gear set (2) via *engagement of* a third form-fit shift element (C) or indirectly coupleable to the sun gear (4) of the first planetary gear set (2) via the second planetary gear set (3) *and engagement of the third form-fit shift element* (*C*), wherein the sun gear (4) of the first planetary gear set (2) is brakeable against a housing via a first form-fit shift element (A), and wherein [the sun gear (4) of the first planetary gear set (2) is coupleable to the carrier (6) of the first planetary gear set (2) via] a second form-fit shift element (B) [while providing] *is engageable to provide* a direct drive at the first planetary gear set (2).

14. The drive system (1) of claim 13, wherein, [when] the drive system (1) comprises the second planetary gear set (3) in addition to the first planetary gear set (2) and at least one further form-fit shift element (E, F) in addition to the first, second, and third form-fit shift elements (A, B, C), the second electric machine (14) is either fixedly connected to a rotary element of the second planetary gear set (3) or is coupleable to a rotary element of the second planetary gear set (2) via the at least one further form-fit shift element (E, F).

[15. A drive system (1) of a motor vehicle, comprising:

a first planetary gear set (2) including a sun gear (4), a ring gear (5), and a carrier (6);

a first electric machine (13) fixedly coupled to the ring gear (5) of the first planetary gear set (2) without a shift element between the first electric machine (13) and the ring gear (5), either directly or indirectly via a second planetary gear set (3); and a second electric machine (14) directly coupleable to the sun gear (4) of the first planetary gear set (2) via a third form-fit shift element (C), wherein the sun gear (4) of the first planetary gear set (2) is brakeable against a housing via a first form-fit shift element (A), and wherein the sun gear (4) of the first planetary gear set (2) is coupleable to the carrier (6) of the first planetary gear set (2) via a second form-fit shift element (B) while providing a direct drive at the first planetary gear set (2).]

[16. The drive system (1) of claim 15, wherein the sun gear (4) of the first planetary gear set (2) is coupleable to the carrier (6) of the first planetary gear set (2) via only the second form-fit shift element (B).]

*17. The method of claim 1, wherein two of the sun gear (4), the ring gear (5), and the carrier (6) of the first planetary gear set (2) are coupleable by engaging the second form-fit shift element (B) to provide the direct drive at the first planetary gear set (2).*

*18. The method of claim 17, wherein the sun gear (4) of the first planetary gear set (2) is coupleable to the carrier (6) of the first planetary gear set (2) by engaging the second form-fit shift element (B) to provide the direct drive at the first planetary gear set (2).*

*19. The method of claim 9, wherein two of the sun gear (4), the ring gear (5), and the carrier (6) of the first planetary gear set (2) are coupleable by engaging the second form-fit shift element (B) to provide the direct drive at the first planetary gear set (2).*

*20. The method of claim 19, wherein the sun gear (4) of the first planetary gear set (2) is coupleable to the carrier (6) of the first planetary gear set (2) by engaging the second form-fit shift element (B) to provide the direct drive at the first planetary gear set (2).*

*21. The drive system (1) of claim 13, wherein two of the sun gear (4), the ring gear (5), and the carrier (6) of the first planetary gear set (2) are coupleable by engaging the second form-fit shift element (B) to provide the direct drive at the first planetary gear set (2).*

*22. The drive system (1) of claim 21, wherein the sun gear (4) of the first planetary gear set (2) is coupleable to the carrier (6) of the first planetary gear set (2) by engaging the second form-fit shift element (B) to provide the direct drive at the first planetary gear set (2).*

* * * * *